March 3, 1936. E. HERING 2,032,576
PIPE JOINT
Filed Aug. 10, 1935
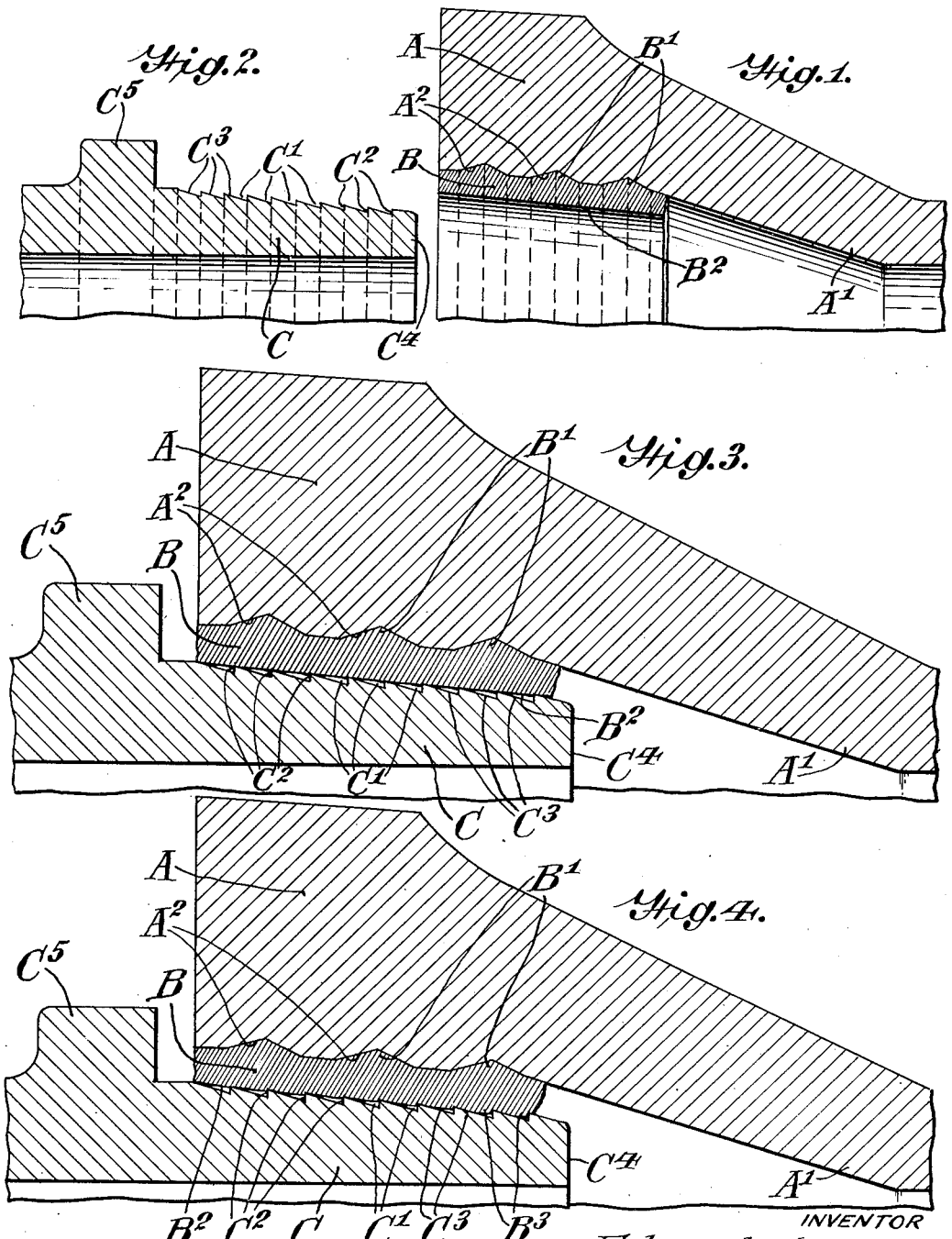
INVENTOR
Edward Hering,
BY
ATTORNEY Patented Mar. 3, 1936

2,032,576

UNITED STATES PATENT OFFICE 2,032,576

PIPE JOINT

Edward Hering, Beverly, N. J., assignor to United States Pipe and Foundry Company, Burlington, N. J., a corporation of New Jersey Application August 10, 1935, Serial No. 35,578

3 Claims. (Cl. 285—115)

My invention relates to pipe joints of the bell and spigot type and is intended for use with pipes of very large diameter such as are frequently laid under water or, for other reasons, on more or less unstable supports. The object of my invention is to provide a pipe joint of such a character that the jointed pipe can, if desired, be coupled under water and which when the bell and spigot are assembled form a joint which can be caulked from the inside of the pipe to expand a gasket of plastic metal, such as soft lead, into intimate contact with a bell and spigot and into such form that portions of the gasket will extend into grooves formed in the spigot in such manner as to anchor the coupled pipes together against longitudinal movement with respect to each other. With these objects in view, I form the bell element of the joint with one or more internal circumferential grooves on its sides and cast or otherwise mold into position a lining gasket, portions of which extend into the grooves on the side of the bell and the inside of which is slightly conically tapered inward. Into the so prepared bell I then force the spigot end of a pipe to be coupled, which spigot end has a generally slightly conical shape adapted to fit against the slightly conical wall of the gasket lining and of such length and shape that when seated in the lined bell its inner end will be spaced from the bottom of the bell in such manner as to leave convenient space for the insertion and operation of a caulking tool acting against the inner end of the gasket lining. The portion of the spigot which is seated on the lining gasket I have formed with a series of shallow grooves preferably having their inner walls radial to the center line of the spigot and their outer walls gradually sloping and, again, preferentially extending to the edge of the radial walls of the adjacent groove.

By the application of jacks or other power mechanism the spigot is forced into the lined bell to form a jamming fit with the lining gasket and after the joint is thus asembled the inner end of the gasket is caulked so as to upset and expand the soft metal and expand portions of it into the grooves formed in the spigot so as to form shoulders which will resist to a very considerable extent forces tending to withdraw the spigot from the bell or loosen its fit with the gasket. It will be understood that the joint which I have described and the method of preparing it obviates the necessity of casting or otherwise forming the soft metal gasket between the spigot and the bell after they are assembled together while at the same time it provides for not only a frictional grip of the spigot on the gasket but for an actual interengagement of the grooved spigot with expanded portions of the gasket, the expansion being brought about by the internal caulking of the gasket after the coupled pipes are in place and at any time thereafter when it becomes necessary to tighten the joint by recaulking.

The preferential form of the grooves formed on the spigot which I have described gives to the spigot in longitudinal section a somewhat saw like outline which I believe is advantageous in enabling the spigot to take a better grip on the gasket.

In view of the large diameter of such spigots as are used in the formation of pipes of very large diameter, it is desirable that the spigot should be stiffened against changes in form and for this purpose I provide on the portion of the spigot or pipe which, in the assembled joint, will lie somewhat in front of the end of the bell, an annular reinforcing ledge or ring but care should be taken that this ledge or ring is so located as not to come in contact with the end of the bell.

For a better understanding of my improved joint and the method of forming it, I refer to the drawing forming part of this specification in which Figure 1 is a longtudinal section through one side of the bell end of a pipe formed with annular grooves on its side wall and provided with a precast lining gasket.

Figure 2 is a similar longitudinal section through one side of the spigot end of the pipe adapted to be coupled to the bell end of the pipe in the formation of the joint.

Figure 3 is a similar longitudinal section through adjacent side walls of the bell and spigot coupled together in a jamming fit and Figure 4 is a view similar to Fig. 3, but showing the joint as completed by the internal caulking of a soft metal gasket.

A indicates the side walls and $A^1$ the bottom of the bell end of a pipe, the side walls being formed with annular grooves as indicated at $A^2$. B indicates an annular gasket of a plastic metal, such as soft lead, precast against the sides of the bell so as to enter and fully engage the grooves $A^2$, by means of annular ribs as indicated at $B^1$. $B^2$ indicates the inner surface of the gasket lining which is of slightly conical form, tapering toward the side of the bell. C indicates the spigot end of a pipe to be coupled with a bell-ended pipe, the spigot end having its portion which is to contact with the gasket formed on a taper corresponding to that of the gasket but provided with a series of shallow grooves indicated at C¹, C¹, which, by preference, have their walls nearest to the end of the spigot formed approximately radial to the center line of the spigot, as indicated at C², and their other or outer walls formed with a gradual taper, as indicated at C³, these tapered walls being preferably continued into contact with the radial walls of adjacent grooves, as indicated. The shape and length of the spigot is such that when seated on the gasket its end C⁴ will be spaced from the bottom of the bell by a distance which will afford ample room for the insertion and operation of a caulking tool acting on the inner end of the gasket. C⁵ is an annular ring or rib formed on a portion of the spigot which in the assembled joint will not come in contact with the end of the bell but which should lie at a short distance from the bell end. B³, Fig. 4, indicates expanded portions of the gasket extending into the grooves C¹ on the spigot and brought about by the caulking of the inner end of the gasket and the consequent expansion of the soft metal into the spigot grooves.

In operation the bell is prepared with a precast gasket lining, as shown in Fig. 1, and the spigot of Fig. 2 is then forced into the lined gasket to form a jamming fit therewith, as shown in Fig. 3. This jamming of the spigot into the lined bell will or may somewhat distort the gasket so as to bring about some projection of its metal into the grooves C¹. After the spigot and bell are assembled, as shown in Fig. 3, the gasket is caulked from its inner end with the results indicated in Fig. 4, that is to say, not only is the contact between the spigot and the gasket tightened but the gasket is, in whole or in part, upset so that portions of its metal are expanded into the grooves in the spigot, as indicated at B³, thus bringing about a much better grip against longitudinal displacement of the bell and spigot than could be effected by a merely jamming fit and, as will be obvious, the gasket can be further caulked from the inside at any time when leaks in the joint develop or are apprehended.

Having now described my invention, what I claim as new and desire to secure by Letters Patent, is:

1. A pipe joint comprising a bell, the sides of which are provided with one or more circumferential grooves, a gasket lining of a plastic metal applied to the side walls of the bell and extending into the grooves formed therein, a spigot having a gradually tapered outline, having a jamming fit with the gasket in a position in which its end is sufficiently far removed from the bottom of the bell to leave room for the application of a caulking tool, said spigot having on its periphery a series of shallow annular grooves into which portions of the soft metal gasket extend.

2. A pipe joint as called for in claim 1, in which the grooves formed in the spigot have approximately radial walls on their inner sides and gradual sloping walls on their outer sides.

3. A pipe joint as called for in claim 1, in which the grooves formed in the spigot have approximately radial walls on their inner sides and gradually sloping walls on their outer sides extending approximately to the top edges of the radial walls of adjacent grooves.

EDWARD HERING.